United States Patent [19]

Amiot et al.

[11] Patent Number: 5,781,188
[45] Date of Patent: Jul. 14, 1998

[54] INDICATING ACTIVENESS OF CLIPS AND APPLYING EFFECTS TO CLIPS AND TRACKS IN A TIMELINE OF A MULTIMEDIA WORK

[75] Inventors: Luc R. Amiot, Boisbriand; Jacques Y. Deveau, Montreal; Michael C. Sheasby, London; Peter H. Ibrahim; Raymond Hill, both of Montreal, all of Canada; Darryl M. Lewis, Bellevue, Wash.

[73] Assignee: Softimage, Montreal, Canada

[21] Appl. No.: 673,223

[22] Filed: Jun. 27, 1996

[51] Int. Cl.[6] ............................................. G06F 3/00
[52] U.S. Cl. ...................................... 345/328; 345/302
[58] Field of Search .............................. 345/326–358, 345/302

[56] References Cited

U.S. PATENT DOCUMENTS

| | | | |
|---|---|---|---|
| 5,148,154 | 9/1992 | MacKay et al. | 345/328 |
| 5,191,645 | 3/1993 | Carlucci et al. | 345/328 |
| 5,206,929 | 4/1993 | Langford et al. | 345/328 |
| 5,339,393 | 8/1994 | Duffy et al. | 345/328 |
| 5,359,712 | 10/1994 | Cohen et al. | 345/328 |
| 5,388,197 | 2/1995 | Rayner | 345/328 |
| 5,404,316 | 4/1995 | Klingler et al. | 345/328 X |
| 5,442,744 | 8/1995 | Piech et al. | 345/328 |
| 5,467,288 | 11/1995 | Fasciano et al. | 345/328 X |
| 5,537,528 | 7/1996 | Takahashi et al. | 345/328 X |
| 5,644,216 | 7/1997 | Blumenau | 345/328 X |
| 5,664,087 | 9/1997 | Tani et al. | 345/328 X |
| 5,682,326 | 10/1997 | Klingler et al. | 345/328 X |

*Primary Examiner*—John E. Breene
*Attorney, Agent, or Firm*—Ronald M. Anderson

[57] ABSTRACT

For use in composing and/or editing a multimedia work that include one or more clips, a technique for indicating an active state of the clip or portion thereof, indicating effects applied to a track or a clip, and indicating a plurality of effects applied to a track or to a clip. At least a portion of the work is graphically represented by one or more timelines on which are disposed one or more clips. An active portion of a clip is indicated by a colored bar that extends under that portion of the clip. Different types of transitions between clips are indicated by using one of different predetermined colors for the colored bar. Effects applied to a track are also represented by color bars that extend above the portion of the track to which the effects apply and are independent of changes to any clip disposed on the track. Predetermined colors are used to indicate the type or class of effect(s) applied. A plurality of effects applied to a clip or to a track are indicated by stacking the colored bars. The duration of the effect(s) are indicated by the relative length of these colored bars.

46 Claims, 11 Drawing Sheets

INDICATING ACTIVENESS OF CLIPS AND APPLYING EFFECTS TO CLIPS AND TRACKS IN A TIMELINE OF A MULTIMEDIA WORK

FIELD OF THE INVENTION

This invention generally relates to a system for creating and modifying a multimedia work, and more specifically, to a system and method for indicating clips that are active and for indicating effects that are applied to components of the multimedia work.

BACKGROUND OF THE INVENTION

When creating a multimedia work that may include a plurality of different components such as animations, video clips, and audio clips, authoring software typically provides a multitude of options for modifying various aspects of the components comprising the work. The components of a graphics sequence created on a computer may comprise a plurality of clips, each of which typically comprises a plurality of frames. When displayed at a sufficiently fast rate, the objects shown in different positions or attitudes in successive frames appear to move, creating an animation. A similar approach is used in video clips, except that the frames of a video clip comprise digitized images rather than graphic illustrations such as those that are typically produced by a two or three-dimensional paint program.

A multimedia work is created by combining various clips. It is generally desirable to provide the user with an indication of the state of the clips loaded into the authoring software. Each of the prior art multimedia authoring software products uses a slightly different user interface to show a track and to indicate the state of the clips comprising a track. The temporal arrangement of clips is generally indicated by an arrangement of the clips along either a horizontal or a vertical axis and is referred to as a "timeline."

For example, in Quantel's HENRY™ software program, the timeline is vertical arrangement of clips. Successive clips that run sequentially appear in the vertical timeline with each successive frame being represented by a rectangle below the preceding frame in the clip. Likewise, each successive clip follows below the preceding clip. A color coded bar extends down the left side of each clip to indicate its state, e.g., the bar is yellow to indicate that a clip is active and that no other portion of any other clip is active. If two successive clips A and B overlap where a transition occurs between the clips, a different color bar is provided that extends along the side of only those frames of the clips that overlap in time.

In Avid's MEDIA COMPOSER™, the timeline is horizontal. Multiple clips can be shown on different tracks during overlapping times; however, vertical ordering of the clips determines the clip or part of a clip that is active at a given time. The program treats any portion of a clip on a track above a portion of another clip (located on a vertically lower track) as the active portion of the clip. Thus, the active portion of any clip is controlled by the relative vertical position of that clip compared to other clips. It will be apparent that the techniques used in the prior art to indicate the active clip or active portion of a clip in a non-linear editing system do not provide much versatility. Ideally, an operator should be able to see all options that are available for use in a work and be able to immediately perceive the options that are being used in the output signal.

An analogous problem arises during the live broadcast of a sports event in which multiple cameras disposed at different locations and capturing different elements of the event are all potentially a source of a network feed signal that is broadcast (or taped). The director of the production must select a particular camera for the signal output at any one time. All of the cameras feed to a central control panel for display on an array of monitors so that all of the views from which one can be selected for the output signal are visible. An indicator identifies which camera is currently active. This approach permits great flexibility and is extremely efficient in enabling an optimum output signal to be selected as the scene being televised or taped changes. Clearly, it would be desirable to extend this concept to multimedia authoring software to enable a user to view all of the clips from which the active clip or portion thereof can be selected and to indicate which portion of any clip is active. Currently, such features are not available.

Multimedia authoring systems typically provide a number of different effects that can be applied to components of the work to modify the output. The term "effect" refers to any processing applied to input data that in some manner alters the data. Effects such as dissolve, wipe, and various digital video effect transitions can be applied to control the appearance applied to a change from one clip to another. Other visual effects such as blur, color correction, and chroma key modify the overall visual appearance of a clip or portion thereof. Still other effects, such as echo, are applied exclusively to audio clips. Since a user can apply any of a rather large number of selected effects to change the result produced in most multimedia authoring software, it is important to provide a visual indication of the type or class of effect being applied and to clearly indicate the portion of a clip to which an effect will apply. The prior art interface schemes for indicating effects differs between each program. Color bars have been used to indicate that an effect is being applied to an entire track or to show the portion of a clip to which the effect applies, with the specific color indicating the type or class of effect being applied. However, there is no provision in the prior art for applying an effect to only a specific portion of a track that is less than the entire track so that the effect is independent of any clip that is placed in that portion. Enabling a user to associate an effect with a specific portion of a track rather than with a clip would have a significant advantage. The user would then be able to change the clip inserted on the track at that point, and the effect associated with that portion of the track would automatically apply to any clip that is thus inserted.

There are clearly times when it will be desirable to apply multiple effects to different portions of a track or a clip. Currently, multimedia authoring software does not provide an effective procedure for selectively applying multiple effects to limited portions of a track. Typically, in prior art multimedia authoring systems, an effect is applied to the entire duration of a clip. If the user wants to apply a first effect (1) to the first half of a clip and a second effect (2) only to the middle one-third of the clip, it will be necessary for the user to divide the clip into four new clips, A–D, where clip A is the first third of the original clip and has only effect (1) applied to it, clip B is the next ⅙ of the original clip and has both effects (1) and (2) applied to it, clip C is the next ⅙ of the original clip and has only effect (2) applied to it, and clip D is the last one third of the original clip and has no effects applied to it. It will be evident that dividing clips to facilitate applying effects to only a portion of a clip is inefficient and that a better approach is required to achieve the desired flexibility.

SUMMARY OF THE INVENTION

In accord with the present invention, a method for indicating activeness of a clip to a user composing and/or editing a multimedia work that includes a plurality of clips provides for displaying a timeline for at least a portion of the multimedia work. The timeline graphically represents the portion of the multimedia work and graphically illustrates a plurality of tracks for a time interval corresponding to that represented by the timeline. The user is enabled to select a clip as active, indicating that the clip is to be used in the multimedia work. The clip selected by the user is marked as active with a visual indicator, so that by inspection of the visual indicator and a position of the clip on one of the plurality of tracks, the user can determine a time during which the clip contributes to the multimedia work.

The user is also enabled to select a portion of the clip as active. The portion of the clip selected as active is then marked with the visual indicator, so that the position of the visual indicator relative to the clip indicates the portion of the clip that is active. Each clip is preferably represented by a rectangle disposed on one of the timelines. A duration of the clip is indicated by either its length or its width. The visual indicator preferably comprises a colored bar disposed adjacent to one edge of the rectangle; the length of the colored bar and its position relative to the rectangle indicates the duration of the portion of the clip that is active. Any portion of a clip added to one of the timelines that does not overlap any portion of another clip that is already active is automatically made active.

Another step in the method provides for enabling the user to select two clips to be simultaneously active at one time when either a transition or an overlay is to occur between the two clips. A visual indicator of the duration of the transition or the overlay between the two clips is then provided. The visual indicator preferably comprises a color bar having a color that indicates a specific type of transition or the overlay between the clips.

There are several advantages to the technique used to indicate whether a clip is active in the present invention. Since both active and inactive clips can be placed on the timeline, the user can visually perceive the contents of the clips that are included to facilitate selecting a clip that will be active. The available options are clearly presented for the user to view, enabling selection of the clip or portion of a clip that will be used in the work.

Another aspect of the present invention is directed to a system for indicating activeness of a clip to a user composing and/or editing a multimedia work that includes a plurality of clips. The system includes a monitor for displaying the multimedia work and for displaying screens used to compose and edit the multimedia work. A memory is included for storing a plurality of machine instructions defining a software program employed for composing and editing the multimedia work. A processor, which is coupled to the memory and to the monitor, executes the machine instructions stored in the memory. The functions implemented by the system as defined by the machine instructions are generally consistent with the steps of the method described above.

Yet another aspect of the present invention relates to a method for indicating effects applied to a specific portion of a multimedia work when composing and/or editing the multimedia work. The method includes the step of enabling the user to select an effect that will apply to the multimedia work and to select a time interval during which the effect will be applied. The effect is associated with a selected track of the timeline by the user and is applied to only a selected portion of the track. An effect indicator indicates the portion of the track to which the effect applies and the time interval of the effect.

The track preferably includes an effect region that extends adjacent to the track. The effect indicator is disposed within the track region. In the preferred form of the invention, the effect indicator comprises a colored bar. A length of the colored bar and its position relative to the track indicates the time interval over which the effect is applied. The effect is applied to a portion of any clip positioned on the track with which the effect is associated, and which is adjacent the colored bar, but the effect is otherwise independent of any clip.

The method enables the user to modify the time interval over which the effect is applied. The modification may include changing a point in time at which the effect is applied and its duration.

In addition, the user can associate a plurality of effects with the track. Each effect can have a user selectable time interval that is independent of the time interval of other effects associated with the track. The plurality of effects are represented by corresponding color bars that are disposed adjacent to the track with which the plurality of effects are associated. A length and a position of each of the color bars indicates the time and duration at which each is applied to the track. Different colors are preferably used for the color bars, each color representing a different type or class of effect.

The order in which the plurality of effects are applied to the track determines the result in the multimedia work. The color bars representing the plurality of effects are thus positioned relative to each other so as to indicate the order in which the effects are applied.

Another aspect of the present invention is directed to a system for indicating effects applied to a specific portion of a multimedia work when composing and/or editing the multimedia work in which a processor executes machine instructions that cause the processor to implement effects generally as described above.

Yet another aspect of the present invention is directed to a method for indicating a plurality of effects that are applied to clips comprising a multimedia work, when composing and/or editing the multimedia work. The method includes the step of enabling the user to select a plurality of different effects that will apply to a clip of the multimedia work and to select a portion of the clip to which each effect will be applied. An effect indicator is provided for each effect to indicate the portion of the clip to which the effect applies and the time interval during which the effect applies.

The effect indicator for each clip preferably comprises a colored bar, a length of the bar and its relative position adjacent the clip indicates the portion of the clip to which the effect applies. The colored bars representing each of the plurality of effects selected by the user for application to the clip are stacked adjacent to the clip. An order in which the colored bars are stacked indicates a sequence in which the effects are applied to the clip to produce a result. The plurality of effects are associated with the clip to which the plurality of effects apply, so that moving the clip along the timeline causes movement of the effects applied to the clip. The method also preferably includes the step of displaying a descriptive label when a cursor is moved over any effect indicator, said descriptive label identifying a type or class of effect that is represented by the effect indicator.

Still another aspect of the invention is a system for indicating a plurality of effects that are applied to clips comprising a multimedia work, when composing and/or editing the multimedia work. A processor executes machines instructions that cause it to implement functions generally consistent with the steps of the corresponding method discussed above.

Yet a further aspect of the invention is directed to an article of manufacture that includes a nonvolatile memory device used to store a plurality of machine instructions. The machine instructions generally cause a computer to implement the functions described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
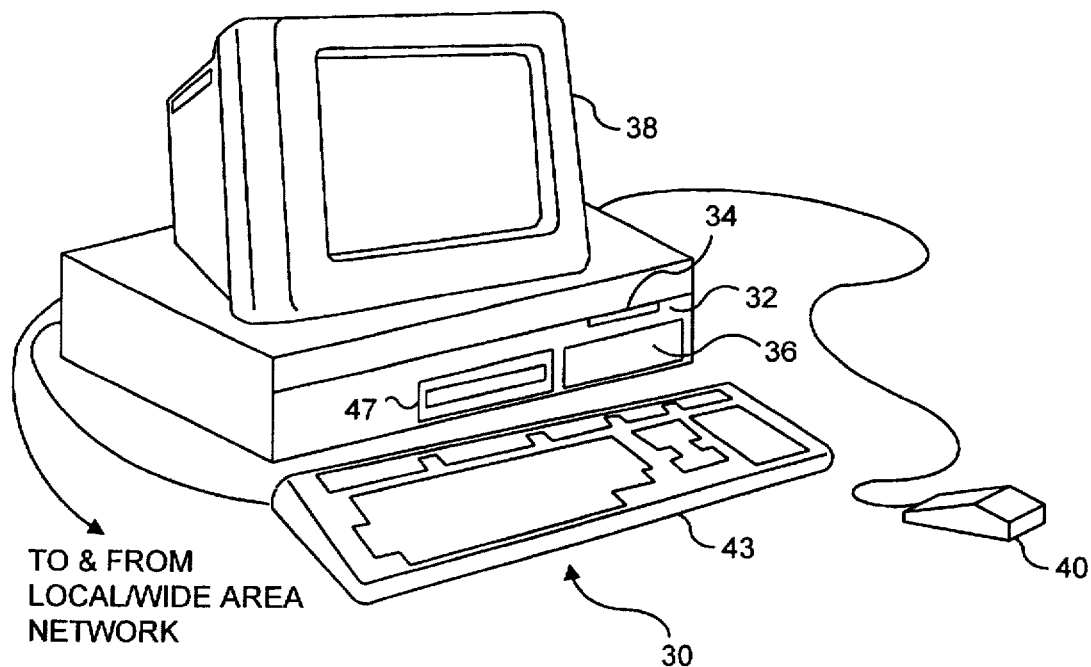
FIG. 1 is an isometric view of a personal computer suitable for implementing the present invention.

With reference to FIG. 1, a generally conventional personal computer 30 is illustrated, which is suitable for use in connection with practicing the present invention. Alternatively, a workstation may be instead be used. Personal computer 30 includes a processor chassis 32 in which are mounted a floppy disk drive 34, a hard drive 36, a motherboard populated with appropriate integrated circuits (not shown), and a power supply (also not shown), as are generally well known to those of ordinary skill in the art. A monitor 38 is included for displaying graphics and text generated by software programs that are run by the personal computer. A mouse 40 (or other pointing device) is connected to a serial port (or to a bus port) on the rear of processor chassis 32, and signals from mouse 40 are conveyed to the motherboard to control a cursor on the display and to select text, menu options, and graphic components displayed on monitor 38 by software programs executing on the personal computer. In addition, a keyboard 43 is coupled to the motherboard for user entry of text and commands that affect the running of software programs executing on the personal computer.

Personal computer 30 also optionally includes a compact disk-read only memory (CD-ROM) drive 47 into which a CD-ROM disk may be inserted so that executable files and data on the disk can be read for transfer into the memory and/or into storage on hard drive 36 of personal computer 30.

Figure 2:
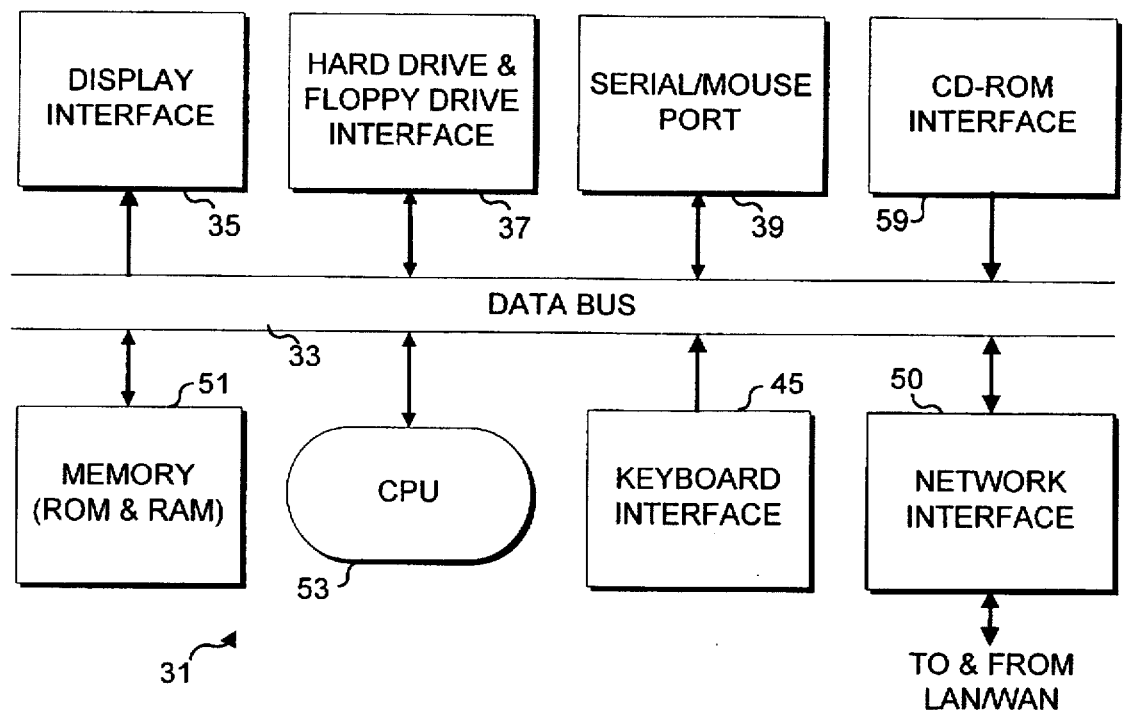
FIG. 2 is a schematic block diagram of functional components included within a processor chassis for the personal computer of FIG. 1.

FIG. 2 is a block diagram illustrating some of the functional components that are included within processor chassis 32. All of the components mounted on the motherboard or otherwise installed inside processor chassis 32 are not illustrated, but the functional blocks shown in FIG. 2 represent the more significant aspects of the personal computer. The motherboard includes a data bus 33 to which these functional components are electrically connected. A display interface 35, for example, a video card, generates signals in response to instructions executed by a CPU 53 that are transmitted to monitor 38 so that graphics and text are displayed on the monitor. A hard drive and floppy drive interface 37 is coupled to data bus 33 to enable bidirectional flow of data and instructions between data bus 33 and floppy drive 34 or hard drive 36. Software programs executed by CPU 53 are typically stored on either hard drive 36, or on a floppy disk (not shown) that is inserted into floppy drive 34. The software program comprising the present invention will likely be distributed either on such a floppy disk, on-line via the modem, or on a CD-ROM disk, and stored on hard drive 36 for execution by CPU 53.

A serial/mouse port 39 (representative of the two serial ports typically provided) is also bidirectionally coupled to data bus 33, enabling signals developed by mouse 40 to be conveyed through the data bus to CPU 53. Alternatively, if a different device such as an external modem (not shown) is coupled to the serial port, data can be transmitted bidirectionally between the CPU and the modem. A CD-ROM interface 59 connects CD-ROM drive 47 to data bus 33. The CD-ROM interface may be a small computer systems interface (SCSI) type interface or other interface appropriate for connection to and operation of CD-ROM drive 47.

A keyboard interface 45 receives signals from keyboard 43, coupling the signals to data bus 33 for transmission to CPU 53. Also coupled to data bus 33 is a network interface 50 (which may comprise an Ethernet card for coupling the personal computer to a local area and/or wide area network). Data used in connection with the present invention may be stored on a server and transferred to personal computer 30 over the network to carryout the functions described below.

When a software program is selected by a user to be executed by CPU 53, the machine instructions comprising the program that are stored on a memory device such as a floppy disk, a CD-ROM, or on hard drive 36 are transferred into a memory 51 via data bus 33. Machine instructions comprising the software program are executed by CPU 53, causing it to implement functions defined by the machine instructions. Memory 51 includes both a nonvolatile read only memory (ROM) in which machine instructions used for booting up personal computer 30 are stored, and a random access memory (RAM) in which machine instructions and data are temporarily stored when executing application programs. The present invention will likely be included in a multimedia authoring software program tentatively called DIGITAL STUDIO™ to be distributed by SoftImage Corporation, a subsidiary of Microsoft Corporation. Due to the size and the number of files comprising this software program, it will preferably be distributed on CD-ROM, but may alternatively be distributed on floppy disks.

Figure 3:
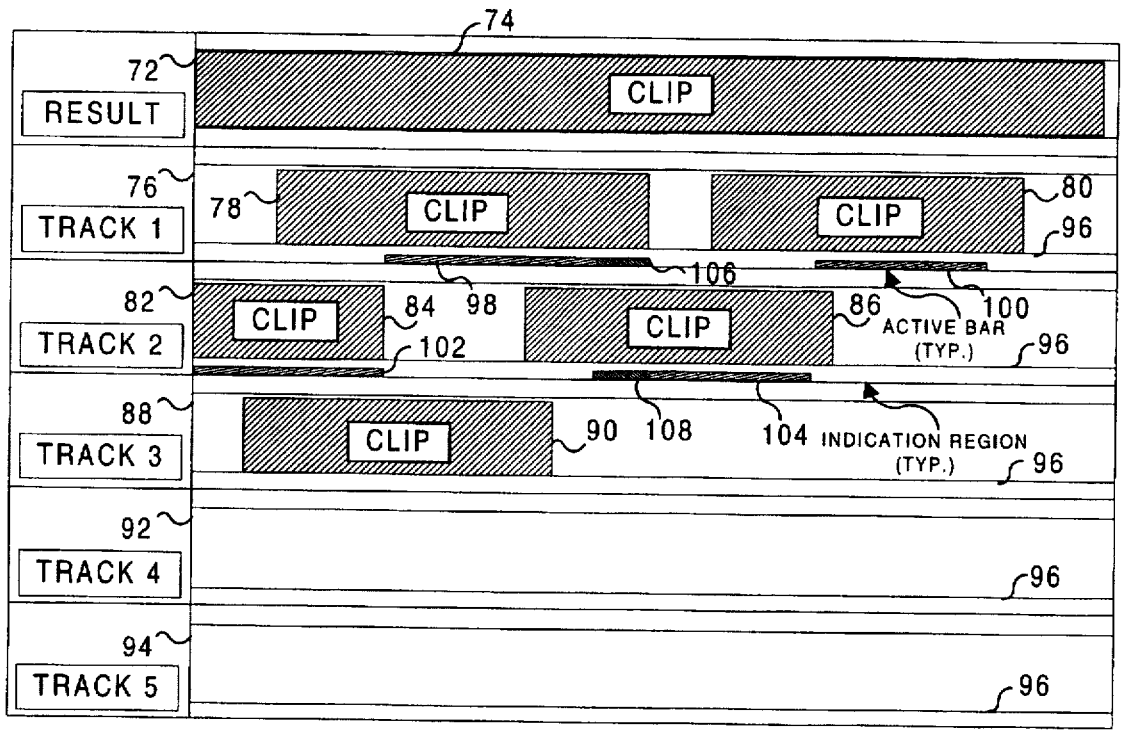
FIG. 3 illustrates a timeline window that includes a result track and up to five component tracks, in which activeness of a portion of a clip on a track is indicated in accord with the present invention.

With reference to FIG. 3, a timeline window 70 that is displayed on monitor 38 when editing a multimedia work in accord with the present invention is shown. Timeline window 70 includes a plurality of vertically arrayed, parallel tracks 72, 76, 82, 88, 92, and 94. Track 72 includes a result or composite clip 74, which represent the output of the work for the portion displayed in timeline window 70; however, a result track is not always present. Time extends from left to right in the timeline window. Each clip comprises a plurality of frames (not separately shown). Track 76 includes two clips 78 and 80, which are not contiguous. Only a portion of each of these clips is active, i.e., used in result clip 74, as explained below. Track 82 includes two clips 84 and 86, but only a portion of clip 86 is used in the result clip. Track 88 includes a single clip 90, but clip 90 is not currently used in the result clip.

Along the bottom of each track extends a region 96 in which the activeness of any portion of a clip in a track is indicated by a color coded bar extending below the active portion of the clip. Thus, in track 76, a yellow bar 98 extends below most of the latter two-thirds of clip 78, indicating that portion under which the yellow bar extends is active and included in result clip 74. (Note that other color coding protocols can alternatively be employed besides those used in this preferred embodiment.) A yellow bar 100 also extends under a portion of clip 80, indicating the portion of clip 80 that is active and included in result clip 74. In track 82, a yellow bar 102 extends under the entire length (duration) of clip 84 in region 96, indicating that the entire content of clip 84 is used in result clip 74. It should be noted that since a timeline can theoretically be of infinite duration, a bar appearing more like a point may be appropriate to represent the duration of a short clip on the timeline, depending on the time resolution applied. A yellow bar 104 extends under most of clip 86, similarly indicating the portion of that clip, which appears in the result clip.

Part of the activeness bar under clip 78 overlaps with part of the activeness bar under clip 86. The portions of each of the two activeness bars that overlap correspond to the duration of a transition between the two overlapping clips. The transitions are represented by different colored (e.g., orange) bar 106 under the right end of clip 78 and by an identically colored (orange) bar 108 under a portion (toward the left end) of clip 86. Generally, except at transitions, only one clip or portion thereof is indicated as being active at one time on the timeline. (This rule applies to non-audio clips; however, multiple audio clips may be active at one time. The multiple audio clips are mixed together during the time of their overlap. A further distinction applies to synchronized audio clips. Any audio clip that is synchronized to a video clip is active only during the time that its associated video clip is active.)

During a visual transition such as a cross-fade or dissolve, two clips are concurrently active. Specific colors are preferably used to indicate each different type of transition, e.g., orange for a dissolve, green for a wipe, and blue for a digital video effect. Even though a clip is not active, such as clip 90, it can still appear on the timeline, enabling a user composing or editing the work to more readily decide whether any portion of the clips on the timeline should be used in the result clip. By enabling the user to visually see all of the clips on the timeline, including those that are not active and thus not included in the result, the user can much more efficiently decide which clips or portions of clips to include and how to configure cuts and transitions between clips. (Optionally, a user may turn-off the visibility of inactive clips and other material so that the only the material contributing to the output is visible.)

When a new clip is "dropped" onto the timeline using a conventional "drag and drop" technique or entered by selecting an option in the menu of the multimedia authoring and editing software, the clip automatically becomes active if no other clip already on the timeline is currently active in the time interval within which the clip is dropped. If dropped at a point on the timeline so that it overlaps a portion of a currently active clip, only the part of the dropped clip that does not overlap the already active portion of another clip becomes active. Those of ordinary skill in the art will appreciate that different rules can readily be applied to handle the drag and drop of a clip on the timeline. For example, a clip that is dropped may be made active over its entire duration, altering the activeness of clips previously active during that time.

The preceding comments are not applicable to audio. In a preferred form of the present invention, there are eight channels of audio, where each mono stream corresponds to a channel; a stereo track has two channels that can be active in parallel and are thus not mutually exclusive, as is the case with video. The number of channels is limited to eight, so that all audio tracks can be active all the time.

In FIG. 3, dropping clip 84 in the position shown on the timeline will automatically cause the entire clip to become active, as indicated by yellow bar 102, since clip 84 does not overlap any portion of another clip that is already active. However, when clip 90 was then dropped onto the timeline, none of it automatically became active, since its entire duration overlaps other active portions of clips previously on the timeline.

The user can readily change the activeness of any clip or portion thereof using either options presented on a screen menu by the software program or more simply by selecting the activeness bar with a screen cursor (using mouse 40 or other pointing device) and dragging the activeness bar to extend or shorten its duration. The activeness bars cannot be dragged or otherwise extended beyond an end of a clip under which they lie, but they can be deleted from a clip or added to an existing clip if no overlap with another active clip is caused by that action. Transitions are created by selecting an edit point (the cut) on a clip and changing it to a transition, e.g., by selecting a "transition button" on a toolbar. This action results in one or more transition dialog boxes opening on the monitor, in which the user can select the type of transition to be applied and other parameters relating thereto. Although not shown, it is possible to have transitions between clips disposed on the same track.

Figure 4:
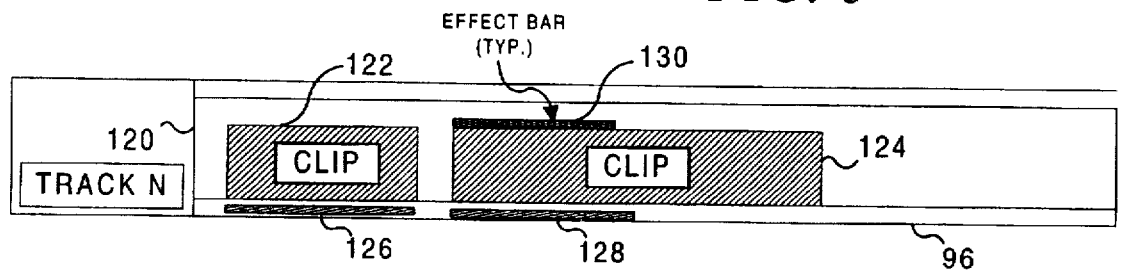
FIG. 4 is a portion of a track from a timeline window showing clip activeness and an effect applied to a portion of a clip are indicated.

Turning now to FIG. 4, a track 120 is illustrated in which two clips 122 and 124 are included. A yellow bar 126 extends under the entire length of clip 122, and a yellow bar 128 extends under approximately the left half of clip 124, indicating that all of clip 122 is active, and about the first half of clip 124 is active. In addition, an effects bar 130 extends over the top left half of clip 124. Effects bar 130 is preferably color coded to represent a particular effect applied to this portion of clip 124. The effect can be any of a number of different types of effects as are commonly applied in digital editing programs, such as blur, convolution, color correction, etc.

Figure 5:
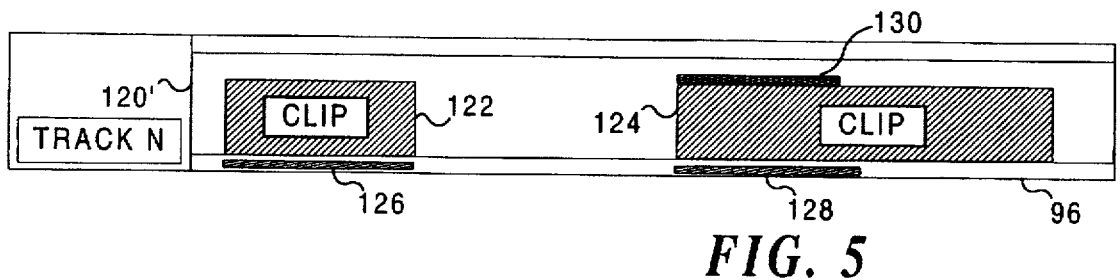
FIG. 5 is the track of FIG. 4, showing one of the clips shifted to a later point along the timeline.

Effect 130 is clip-based and is associated with a single clip. In FIG. 5, a track 120' is shown, which is identical to track 120, except that in track 120', clip 124 has been shifted to a later point in time (along with its activeness bar). When clip 124 is moved along the timeline in this manner, effect bar 130 is automatically moved with the clip. The length of effect bar 130 determines the portion of clip 124 to which the effect applies. Using the screen cursor or specified keyboard shortcuts, a user can lengthen or shorten the effect duration and can shift the effect to apply to any portion of clip 124. However, the effect cannot extend beyond the beginning or end of a clip with which it is associated and is automatically removed if the clip is removed from the track.

Figure 6:
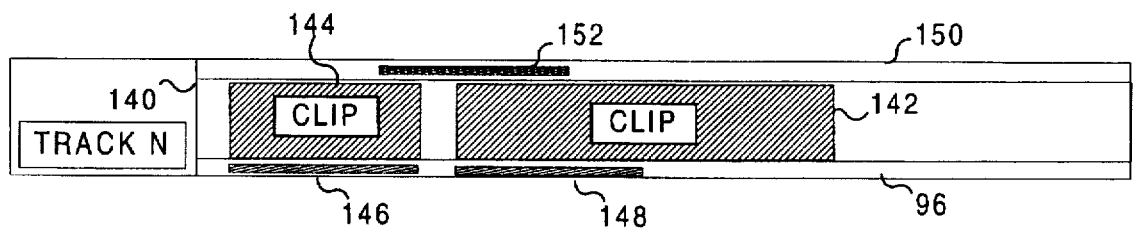
FIG. 6 is a track to which a track-based effect has been applied.
Figure 7:
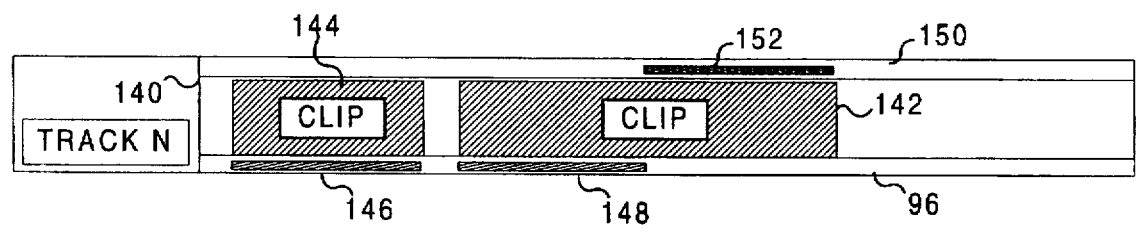
FIG. 7 illustrates the change in the timeline of FIG. 6 that occurs when the track-based effect is shifted to a later point in time.

In contrast to the preceding example illustrating the use of clip-based effects, FIGS. 6 and 7 show a track-based effect applied to a track 140. Track 140 includes clips 144 and 142. As indicated by a yellow bar 146 extending under clip 144 and a yellow bar 148 extending under the first half of clip 142, all of clip 144 is active, and the first half of clip 148 is active. Along the top of track 140 is a track effects region 150. Within the track effects region is an effect bar 152 that extends over parts of clips 142 and 144. Again, effect bar 152 can represent virtually any of a multitude of different effects commonly applied to portions of a multimedia work. If clips 142 and 144 are audio clips, the effect bar will represent an effect appropriately applied to an audio clip, such as echo, compression, or equalization. If the clips are video or three dimensional paint clips, the effect will be visual in nature, as appropriate for that type of clip. The duration of the effect represented by effect bar 152 is indicated by the relative length of the effect bar. The type or class of effect is indicated by a predetermined color coding scheme, generally as noted above in connection with clip-based effects. It is also contemplated that other types of visual effect indicators, such as graphic icons, could be used to indicate each type or class of effect. Further, such other types of visual indicators can be grouped other than in vertical stacks. For example, if a timeline is vertical, the group of icons or other visual indicators could be arrayed horizontally adjacent to the timeline.

Effect bar 152 is associated with track 140 and is thus independent of the clips placed on the track or of their location or duration. As shown in FIG. 7, the track-based effect bar can be moved along the timeline independent of any clip on the track. If clip 142 is removed, effect bar 152 is not changed. Any portion of a clip placed on track 140 under effect bar 152 will have the effect represented by the effect bar applied to that portion of the clip. Because effect bar 152 is track-based, a user can select the effect represented thereby, set up all of the parameters of the effect, and then change the duration and position of the effect bar in track effect region 150 independent of the clips that are loaded on the track. These clips can then readily be changed or modified, enabling the user to observe the effect applied to each clip or portion of a clip that is moved under effect bar 152.

Figure 8:
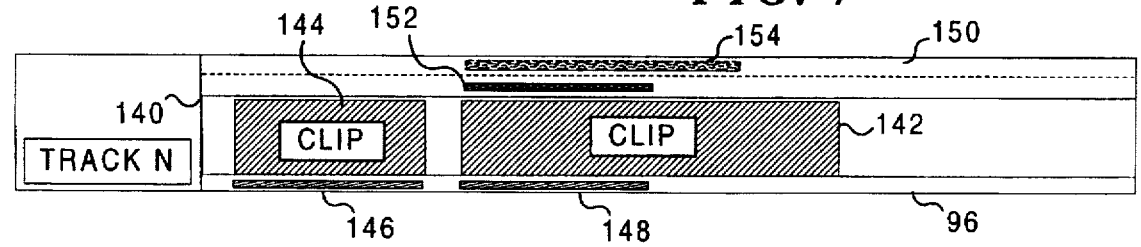
FIG. 8 illustrates an timeline in which a track-based effects stack is used.

In FIG. 8, track effect region 150 is modified to show stacked track-based effects. In this Figure, an effect bar 154 has been added above effect bar 152 and extends beyond the right end of effect bar 152. The stacking order of effect bars 152 and 154 controls the order in which they are applied to modify any clips or portions thereof underlying both effect bars. Specifically, the effect represented by effect bar 152 will be applied first, e.g., to the first part of clip 142, and then the second effect represent by effect bar 154 will be applied. Since effect bar 154 extends beyond effect bar 152, only the effect it represents will apply to the portion of any clip underlying the portion of effect bar 154 that extends beyond the end of effect bar 152. This arrangement provides considerable versatile control over the portions of any clip to which an effect applies.

Figure 9:
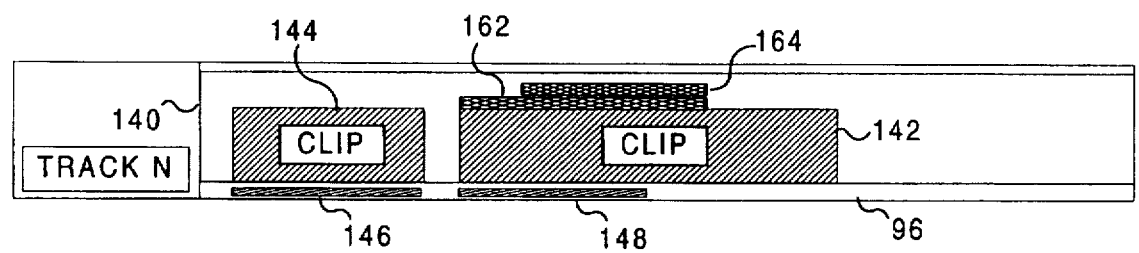
FIG. 9 illustrates a timeline in which an effects stack is applied to a clip.
Figure 10:
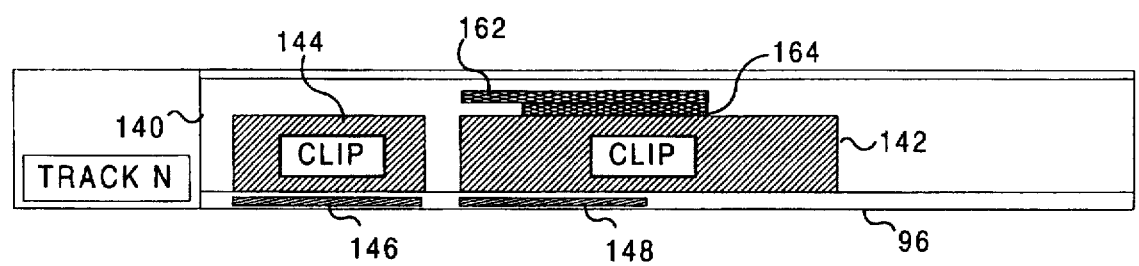
FIG. 10 shows a track in which the order of the effects in the stack applied to the clip of FIG. 9 is changed.

In FIGS. 9 and 10, clip-based effect stacks are illustrated comprising an effect bar 162 and an effect bar 164. Each of these effect bars represents a different effect that is associated with clip 142. The duration of each of the clip-based effects represented by effect bars 162 and 164 is indicated by the relative length of the effect bars. The stacking order determines the order in which the effects are applied to the clip with which they are associated, with the effect bar closest to the clip being applied first. Thus, in FIG. 9, the effect represented by effect bar 162 is applied first to the underlying portion of clip 142. Since effect bar 164 is shorter, the effect it represents is applied only to the right portion of the first half of clip 142 as changed by the effect represented by effect bar 162. In FIG. 10, the order of effect bars 162 and 164 and the processing to achieve the effects they each represent is reversed. The result achieved from this arrangement of stacked effects can differ significantly from the result obtained for the clip-based effect stack shown in FIG. 9.

Figure 11:
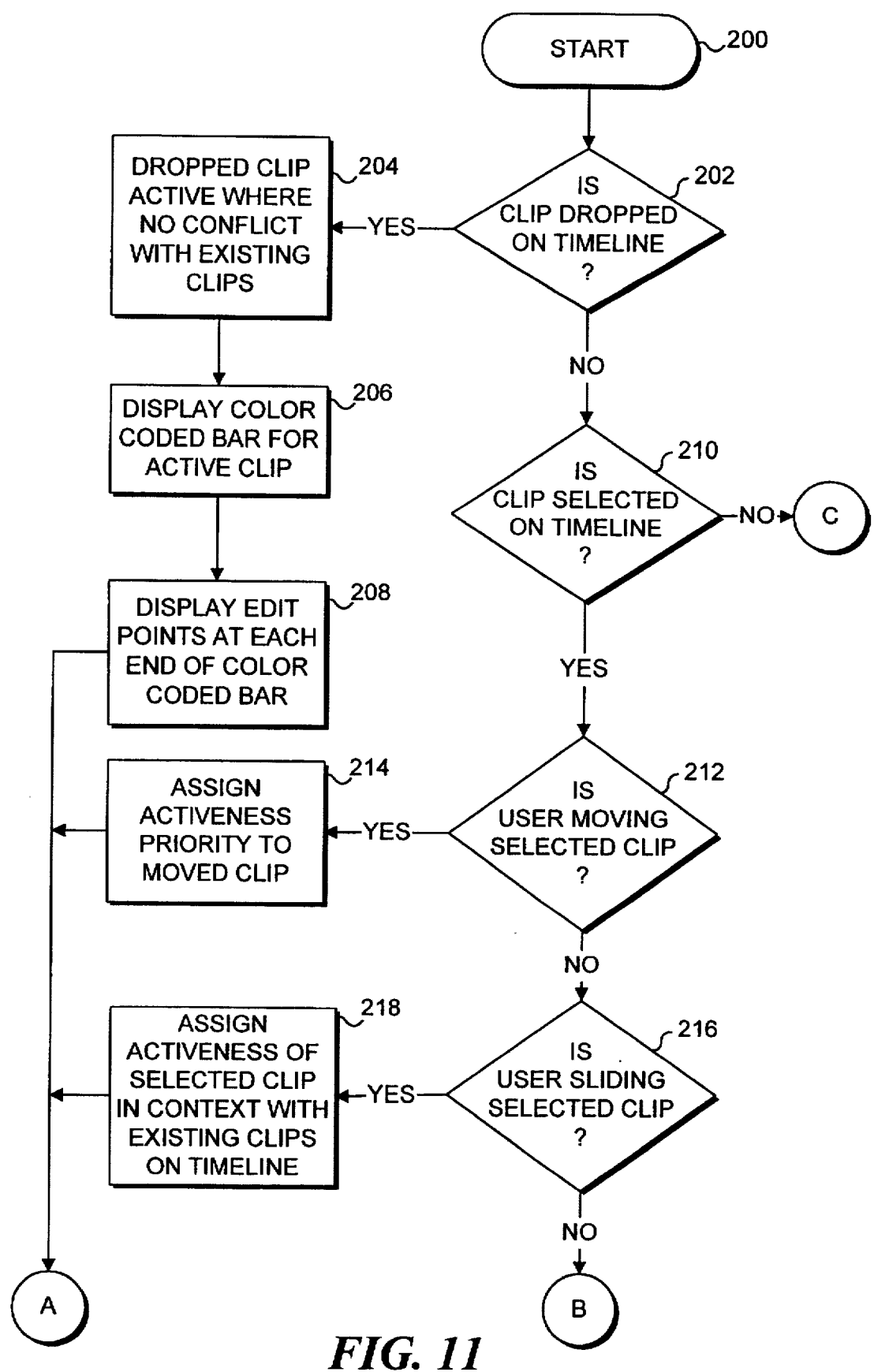
FIGS. 11 through 16 are a flow chart showing the logical steps used for determining activeness of clips and portions of clips on timelines.

In FIGS. 11 through 16, the logic flow for implementing selection and activeness in the present invention is illustrated. Referring now to FIG. 11, in a start block 200, the program begins by monitoring input devices for multimedia authoring commands provided by a user. Once a command or action has been received, the logic flow advances to a decision block 202, where the program determines if user has dropped a clip on a timeline. If the action is "a dropped clip," then the logic flow advances to a logic block 204 and the program makes the clip active. A clip "dropped" onto the timeline using a conventional "drag and drop" technique (or entered by selecting an option in the menu of the program) automatically becomes active if no clip (or portion thereof) already on the timeline is currently active within the time interval in which the clip is dropped. If dropped at a point on a timeline that overlaps a portion of a currently active clip, only the part of the dropped clip that does not overlap the already active portion of another clip becomes active. In a logic block 206, the program displays a color coded bar for that portion of the dropped clip that is now active.

Next, the logic flow advances to a logic block 208 and displays edit points at each end of the color coded bar applied to the dropped clip. After displaying the edit points, the logic flow advances to an end block 242, where the program flow loops back to start block 200 to await another user action. However, if the program concludes in decision block 202 that a clip was not dropped on a timeline, the logic flow advances to a decision block 210, where the program determines whether or not a clip has been selected on the timeline. If so, the logic flow advances to a decision block 212, to determine whether the user is moving the selected clip on the timeline. If so, the logic advances to a block 214, where the program assigns the moved clip priority over existing active clips and globally redetermines the activeness for the timeline. After reevaluating the clip activeness, the logic flow advances to end block 242. At this point, the program normally loops back to start block 200 and awaits further user actions.

In decision block 212, the program can also conclude that a selected clip was not moved, and the logic flow advances to a decision block 216, where the program will ascertain whether the user has slid the selected clip along the timeline. If so, the logic advances to a block 218, to redetermine the activeness of the sliding clip in context with existing clips and globally reevaluate the activeness of the timeline. Once the evaluation is complete, the logic advances to end block 242, and then loops back to start block 200 to await yet another user action. However, the program can also conclude that a selected clip was not slid on the timeline in decision block 216; in response, the logic advances to a decision block 220 as shown in FIG. 12.

Figure 12:
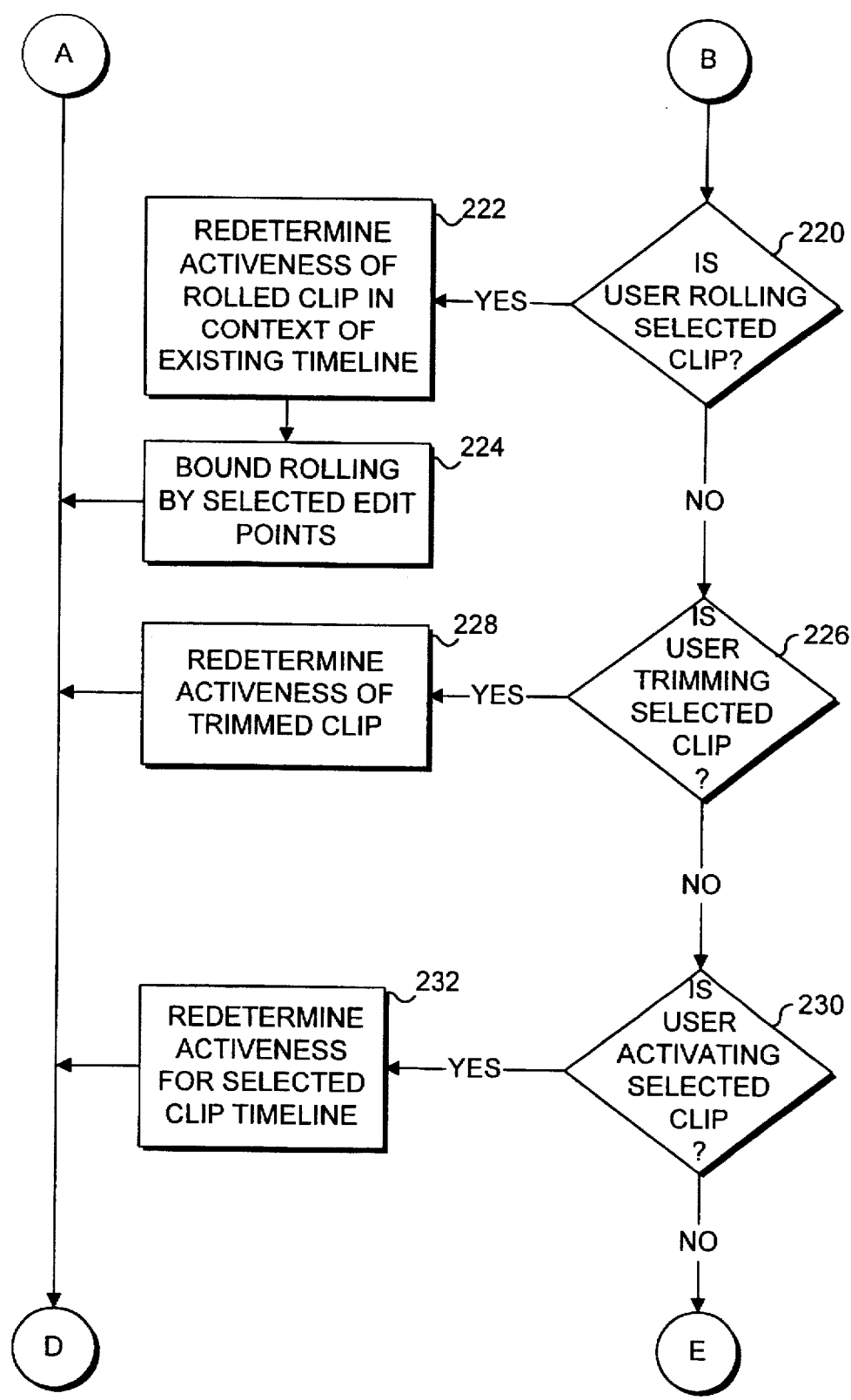

Referring now to FIG. 12 and decision block 220, the program determines whether the user is rolling the activeness of the selected clip left or right within the constraints of the clip's existing activeness edit points. If so, the logic advances to a block 222, where the program redetermines the activeness of the selected clip by giving it priority over existing clips on the timeline. Next, the logic advances to a block 224, where the program globally redetermines the activeness of the timeline and binds the selected clip's activeness relative to the edit points. After completing these determinations, the logic advances to end block 242, looping back to start block 200 to await another user action.

In decision block 220, the program may conclude that the clip was not rolled. If not, the logic advances to a decision block 226, where the program determines whether the user has selected the clip for trimming. If so, the logic advances to a block 228, and the program trims the selected clip. After trimming, the activeness of the timeline is globally redetermined using the selected clip and all existing clips on the timeline. Once this evaluation is performed, the logic advances to end block 242 and loops back to start block 200 to await further user actions.

Each time that the activeness of the timeline is redetermined, the result depends upon the nature of the change effected by the user (whether trimming, inserting, or deleting a clip) and the status of one or more related parameters that have been selected by the user. For example, if a clip is dropped onto the timeline over an existing clip, the redetermination of activeness will either move the existing clip to make room for the new clip if a "ripple mode" parameter is selected, or will delete the existing clip if not. However, since the rules applied for redetermining the activeness of the timeline are outside the scope of the present invention, there seems little reason to discuss such details in this disclosure.

If the program concludes that a user is not trimming a selected clip in decision block 226, the logic advances to a decision block 230, where the program determines whether the user has activated the selected clip. If so, the logic advances to a block 232, where the program activates the selected clip and globally redetenmines the activeness of the clip and the timeline. After the evaluation of activeness has been completed, the logic advances to end block 242 and back to the start of the procedure.

Figure 13:
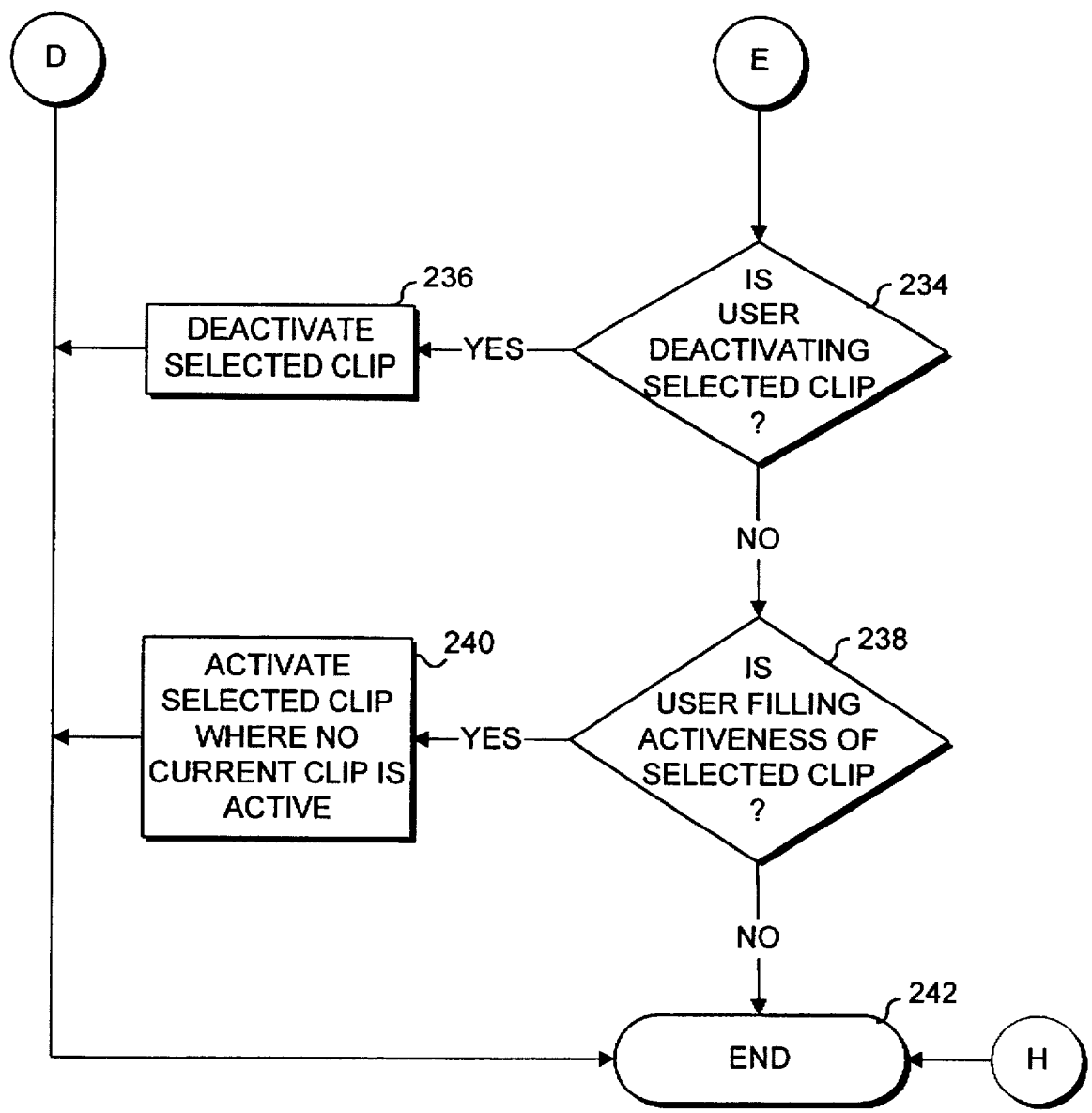

In decision block 230, the program may conclude that the user was not activating the selected clip, and if so, advances to a decision block 234. Referring now to FIG. 13 and decision block 234, the program determines whether the user has deactivated the selected clip. If so, the logic advances to a block 236, where the program deactivates the selected clip and globally redetermines the activeness of the timeline with regard to any remaining active clips. Next, the logic advances to end block 242 and loops back to start block 200 to await another action by the user.

However, if in decision block 234 the program determines that a user is not deactivating a selected clip, the logic advances to a decision block 238, to determine whether a user is "filling the selected clip with activeness." If so, the logic advances to a block 240 and the program makes active (fills in) those parts of the clip where there is no current activeness along the timeline from other existing clips. Once the clip activeness is filled in, the logic advances to end block 242, where the program flow loops back to start block 200 and awaits a further action by a user. However, if the program concluded in decision block 238 that a user has not selected a clip in which the activeness if to be filled, the logic advances to end block 242, where the program loops back to start block 200 to await another action by the user.

Figure 14:
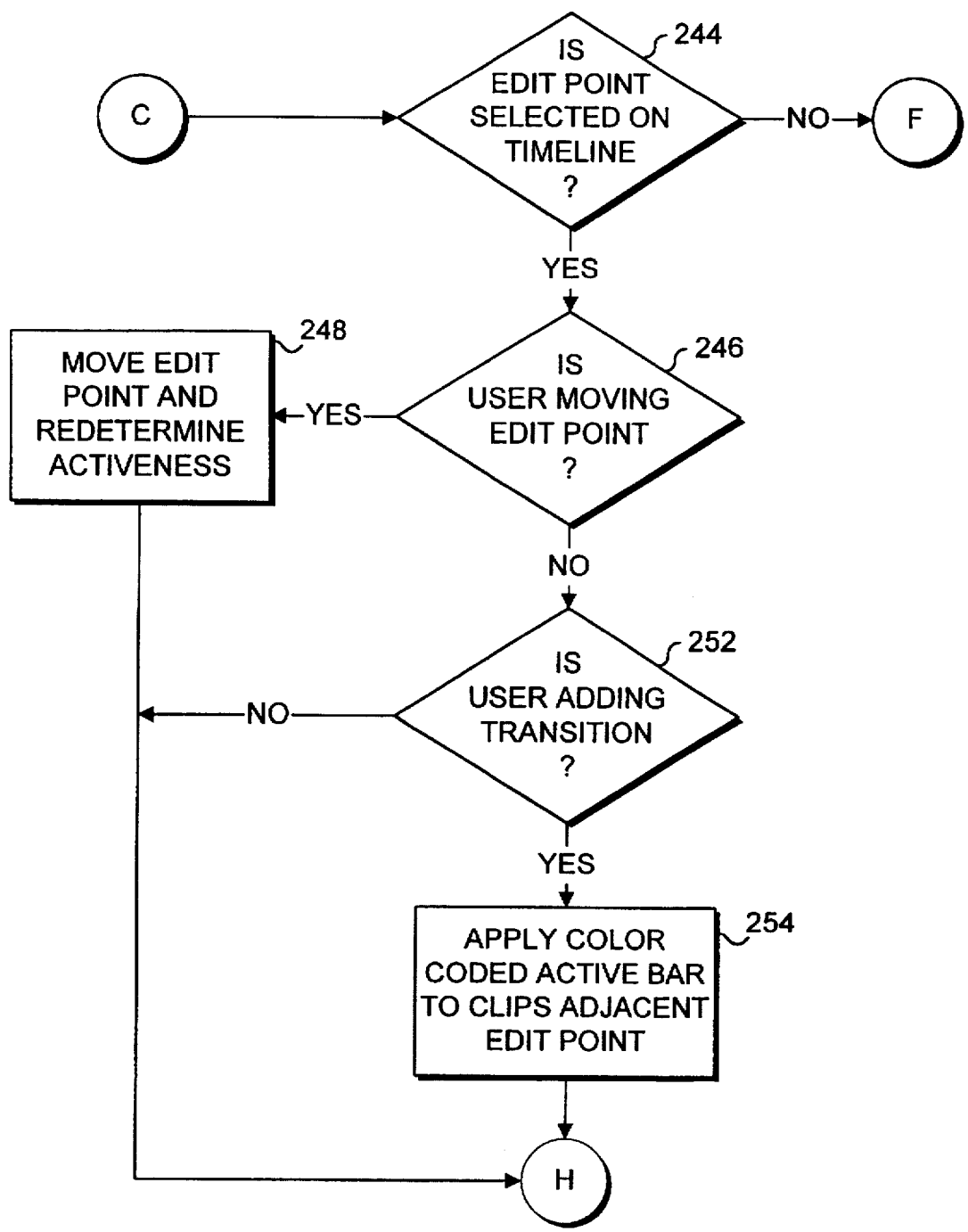
Figure 15:
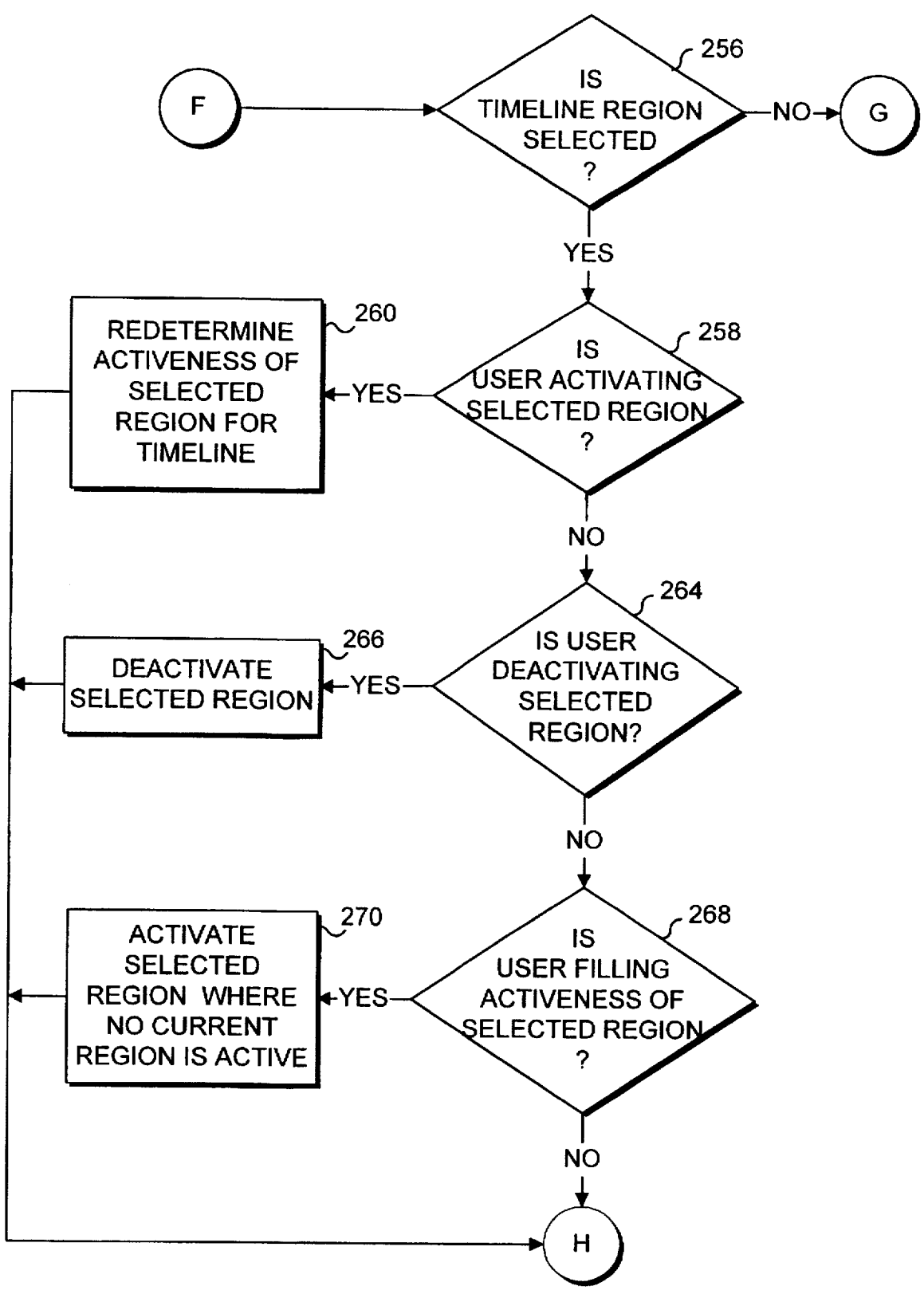

Referring back to FIG. 12 and decision block 210, if the program concludes that the user had not selected a clip on the timeline, then the logic advances to a decision block 244. Referring now to FIG. 14 and decision block 244, the program determines if an edit point has been selected on the timeline. If so, the logic advances to a decision block 246, where the program determines if the user has moved the selected edit point. Once the program concludes an edit point was selected for moving, the logic advances to a block 248, which provides for moving the selected edit point to the new location and then globally redetermines the activeness for the timeline. Next, the logic advances to end block 242, with the subsequent loop back to start block 200.

In decision block 246, the program may determine that the user is not moving the selected edit point, and if so, the logic advances to a decision block 252. In this decision block, the logic determines whether the user has added a transition to the selected edit point. If no transition is added, the logic advances to end block 242 and loops back to start block 200. Alternatively, in decision block 252, the program may decide that the user has added an edit point transition, and if so, the logic advances to a function block 254, where the program adds color coded activeness bars representing the transition to the clips immediately adjacent to the selected edit point. Once the activeness bars have been applied, the logic advances to end block 242, looping back to start block 200 to await a further action by the user.

Referring to decision block 252, if an edit point was not selected on the timeline, the logic advances to a decision block 256. Referring now to decision block 256 in FIG. 15, the program determines whether a timeline region was selected by the user. If so, the logic advances to a decision block 258, to determine if the user is activating the selected region. Once the program concludes the region has been activated, the logic advances to a block 260. In block 260, the program globally redetermines the selected region's timeline. After performing this evaluation, the logic advances to end block 242.

At decision block 258, the program may determine that the user has not activated the selected region and will then advance to a decision block 264. In decision block 264, the program determines whether the user has deactivated the selected region. If so, the logic advances to a block 266, to deactivate the selected region. After deactivation, the logic advances to end block 242. However, a negative response to decision block 264 indicates that the user did not deactivate the selected region. In this case, the logic advances to a decision block 268, where the program determines whether the user has selected filling in the activeness of the region. If so, the logic advances to a block 270, in which the region is made active in those areas where there is no conflict with current active regions on the timeline.

After filling in the selected region, the logic advances to end block 242. Alternatively, if the program concludes in decision block 268 that the user is not filling the selected region with activeness, then the logic advances to end block 242, where the program flow loops back to start block 200 to await further user actions.

Figure 16:
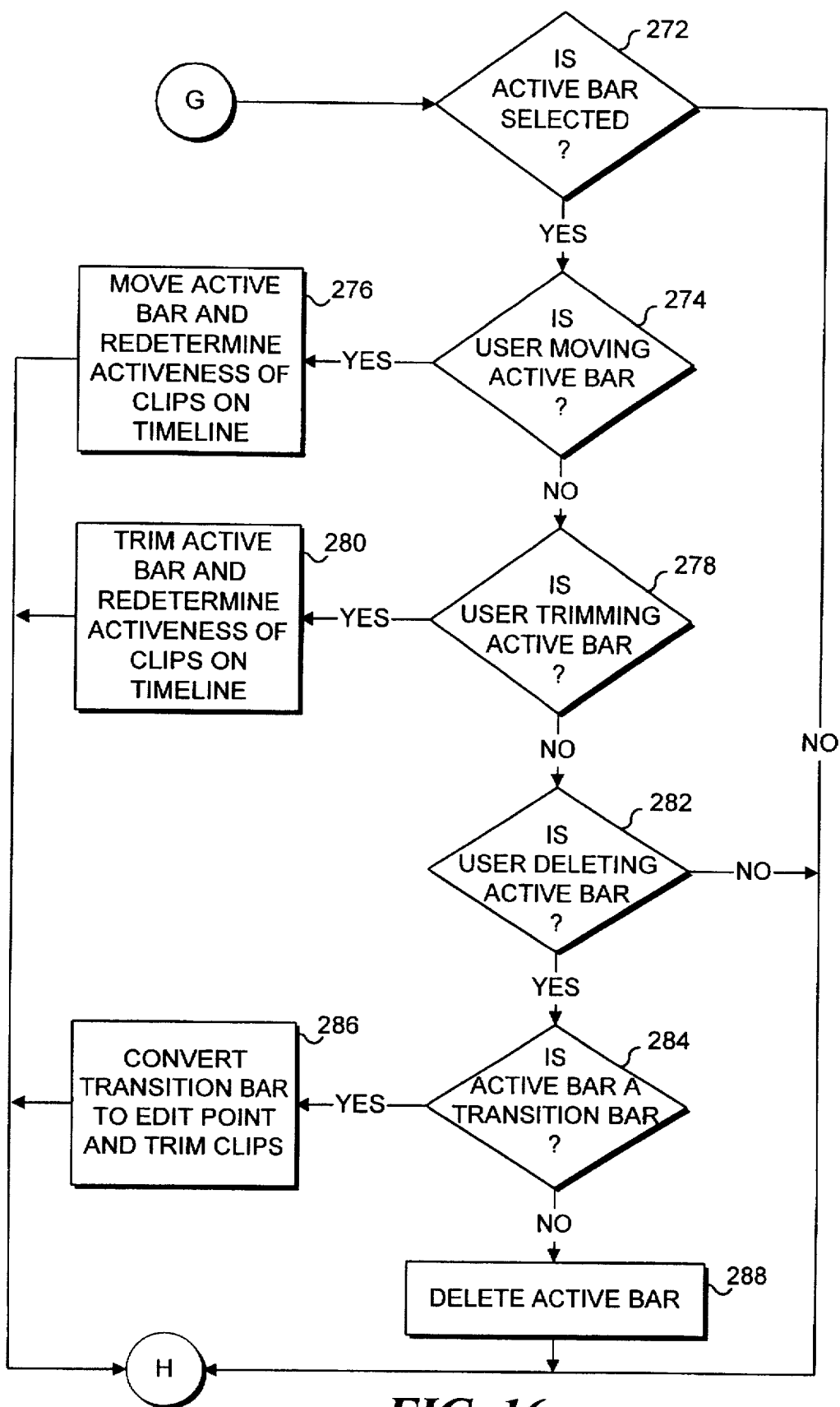

Referring to decision block 256, if the program decides that a region has not been selected, the logic advances to a decision block 272. In this decision block, the program determines if an active bar has been selected. Referring to FIG. 16 and decision block 272, if the program concludes that an active bar has not been selected, then the logic advances to end block 242. Alternatively, if the program concludes that an active bar has been selected, the logic advances to a decision block 274, where the program determines if the user has moved the selected active bar. If so, the logic advances to a block 276. In block 276, program moves the active bar to the new location selected by the user and globally redetermines the activeness of the timeline. After the activeness is redetermined, the logic advances to end block 242, looping back to start block 200 to await still further user actions.

A negative response to decision block 274 indicates that the user is not moving the selected active bar. In response, the logic advances to a decision block 278, where the program determines if the user is trimming the bar. If so, the logic advances to a block 280 to trim the selected active bar and then globally redetermines the activeness of the timeline. Afterwards, the logic advances to end block 242 and back to start block 200.

In decision block 278, if the user is not trimming the selected active bar, the logic advances to a decision block 282, where the program determines whether the user wants to delete the selected active bar. If the bar is not selected for deletion, the logic advances to end block 242. Alternatively, if the program concludes that the user does want to delete the selected active bar, the logic advances to a decision block 284. This decision block determines whether the selected active bar is a transition bar, and if so, the logic advances to a block 286. In block 286, the program converts the transition bar into an edit point by trimming the clips. After creating the edit point, the logic advances to end block 242. However, if the program concludes in decision block 284 that the selected active bar is not a transition bar, the logic advances to a block 288. In block 288, the program deletes the selected active bar. Once the bar is deleted, the logic advances to end block 242, looping back to start block 200 to await yet another action by the user.

Figure 17:
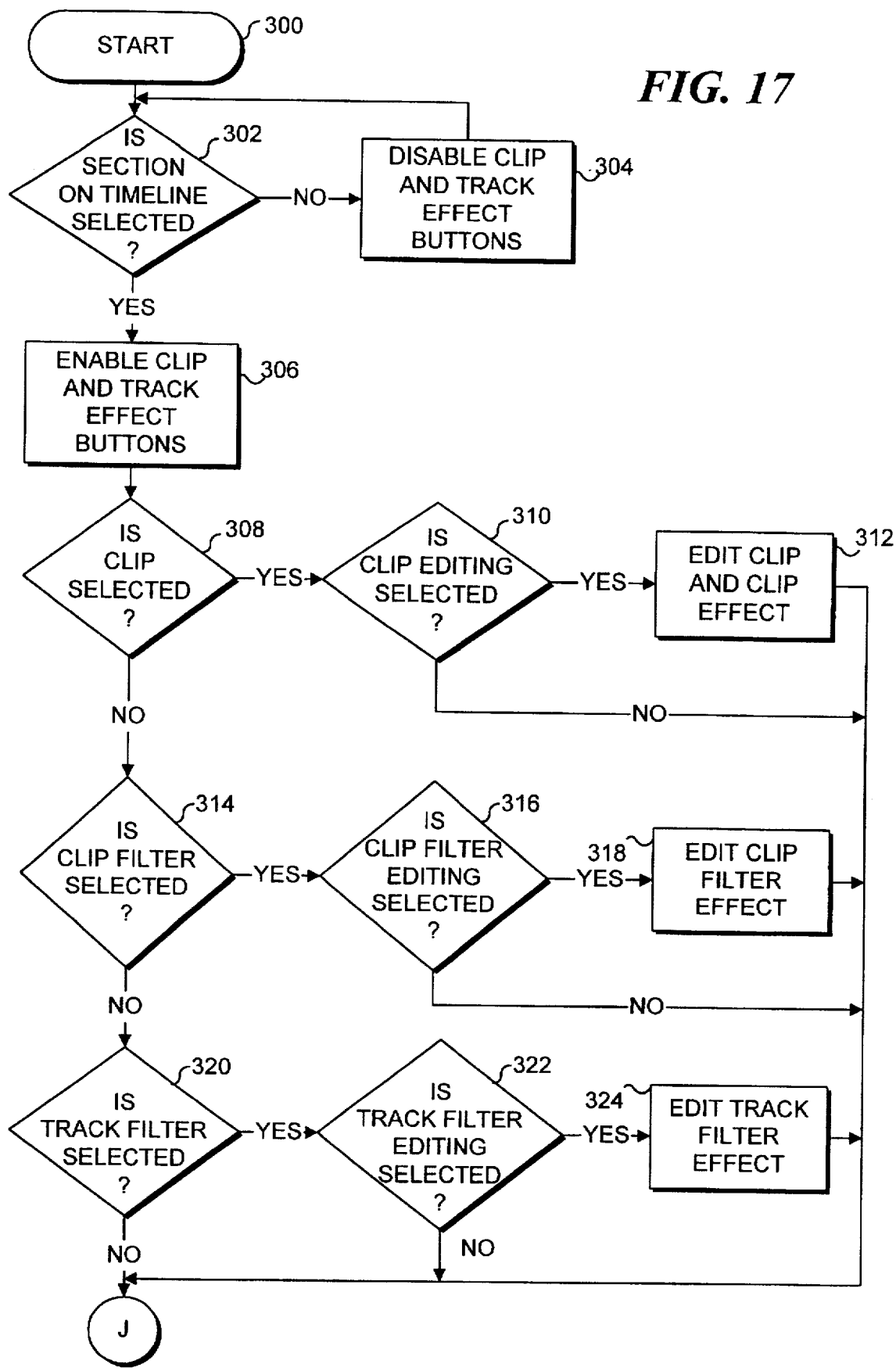
FIGS. 17 and 18 are a flow chart showing the logic used in the present invention for handling stacked effects applied to clips and tracks.
Figure 18:
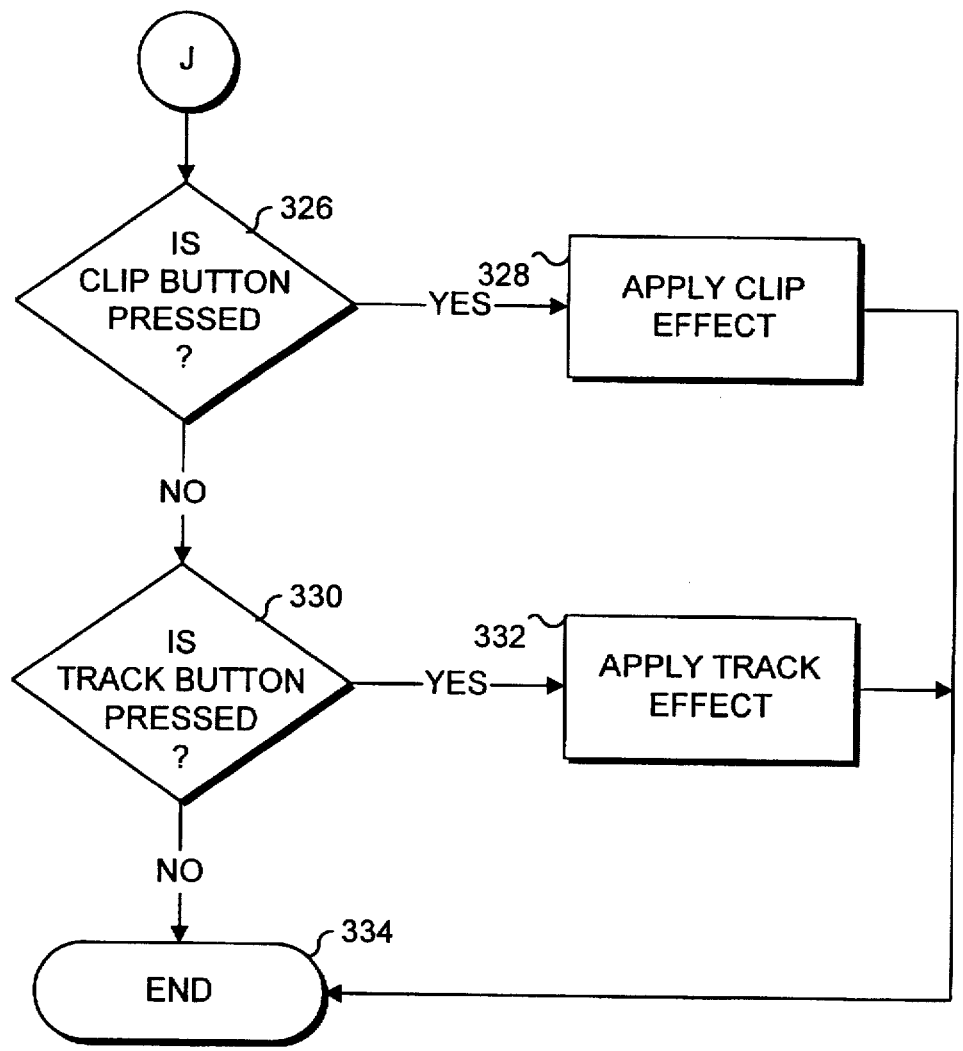

Turning now to FIGS. 17 and 18, a clip and track based effects flow chart is illustrated. In FIG. 17, the logic begins with a start block 300 and advances to a decision block 302, to determines whether a section on the timeline has been selected, i.e., has a clip, a time span, or any other object on the timeline been selected that defines a region or time duration on the timeline. If no section on the timeline has been selected, the logic advances to a block 304, in which the program disables the clip and track effect buttons (or any other applicable user interface mechanism for selecting effects). After disabling the buttons, the logic loops back to decision block 302 to await the selection of something on a timeline by the user. Once a selection has been made on the timeline, the logic advances to a block 306, where the program enables the clip and the track effect buttons. After the buttons are enabled, the logic advances to a decision block 308. In this decision block, the program determines if a clip has been selected. If the response is affirmative, the logic advances to a decision block 310, in which the program decides whether the clip editing feature has been selected. If it has, the logic advances to a block 312, to edit the clip and clip effect. After editing, the logic advances to a decision block 326 as shown in FIG. 18. Further, if the program concluded in decision block 310 that a clip was not selected for editing, then the logic advances to decision block 326.

In the response to decision block 308 is negative, the logic advances to a decision block 314, where the program determines whether the user has selected a clip filter. If so, the logic advances to a decision block 316. In decision block 316, the program determines whether clip filter editing has been selected. If this type of editing is selected, the logic advances to a block 318 to edit the clip filter effect. Once the clip effect is edited, the logic advances to decision block 326 in FIG. 18. Further, if the program concludes in decision block 316 that a clip filter was not selected for editing, the logic also advances to decision block 326.

In decision block 314, the program may conclude that a clip filter was not selected and then advances to a decision block 320. At this point, the program determines whether a track filter was selected by the user. If the filter was selected, the logic advances to a decision block 322, to determine whether the track filter was selected by the user for editing. If so, the logic advances to a function block 324, and the program edits the track filter effect accordingly. Once the track filter effect is edited, the logic advances to decision block 326 in FIG. 18. Further, if the program concludes a track filter was not selected in decision block 320, the logic also advances to decision block 326.

At decision block 326 in FIG. 18, the program determines if a clip button has been pressed by a user. If so, the logic advances to a block 328, where the program applies the selected clip effect. After the effect has been applied, the logic advances to an end block 334 and loops back to start block 300 to await another action by the user. In decision block 326, the program may conclude that a clip button was not pressed and, in response, the logic advances to a decision block 330. In decision block 330, the program determines whether a track button has been pressed by the user. If so, the logic advances to a block 332, where the program applies the selected track effect. Once the track effect has been applied, the logic advances to end block 334, where the program loops back to start block 300 to await yet another action by the user. Further, the same result occurs if the program concludes in decision block 330 that a track button was not pressed.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for indicating activeness of a clip to a user who is composing and/or editing a multimedia work that includes a plurality of clips, comprising the steps of:
   (a) displaying a timeline for at least a portion of the multimedia work, said timeline graphically representing the portion of the multimedia work and graphically illustrating a plurality of tracks for a time interval corresponding to that represented by the timeline;
   (b) enabling the user to select a clip as active, indicating that said clip is to contribute to an output comprising the multimedia work; and
   (c) marking the clip selected by the user as active with a visual indicator, so that by inspection of the visual indicator and a position of the clip on one of the plurality of tracks, the user can determine a time during which the clip contributes to a content of the multimedia work.

2. The method of claim 1, further comprising the steps of enabling the user to select a portion of the clip as active; and, marking the portion of the clip selected as active with the visual indicator, the position of the visual indicator relative to the clip indicating the portion of the clip that is active and contributes to the multimedia work.

3. The method of claim 2, wherein each clip is represented by a rectangle disposed on one of the timelines, a duration of said clip being indicated by the a relative size of the rectangle in at least one dimension, said visual indicator comprising a colored bar disposed adjacent one edge of the rectangle, a length of the colored bar and position of the colored bar relative to the rectangle indicating the duration of the portion of the clip that is active.

4. The method of claim 2, further comprising the step of automatically making active any portion of a clip added to one of the timelines, where said portion does not overlap any portion of another clip that is already active.

5. The method of claim 1, further comprising the steps of enabling the user to select two clips to be simultaneously active at one time when one of a transition and an overlay is to occur between the two clips; and, providing a visual indicator of the duration of said one of the transition and overlay between the two clips.

6. The method of claim 5, wherein the visual indicator comprises a color bar having a color that indicates a specific type of said one of the transition and the overlay between the clips.

7. The method of claim 1, wherein the user can visually perceive the contents of a plurality of clips that are included on the timeline to facilitate determining whether to make a clip active or inactive.

8. A system for indicating activeness of a clip to a user composing and/or editing a multimedia work that includes a plurality of clips, comprising:

(a) a monitor for displaying the multimedia work and for displaying screens used to compose and edit the multimedia work;

(b) a memory for storing a plurality of machine instructions defining a software program for composing and editing the multimedia work; and (c) a processor, coupled to the memory and to the monitor, for executing the machine instructions stored in the memory, said machine instructions causing the processor to implement the following functions:

(i) display a timeline for at least a portion of the multimedia work on the monitor, said timeline graphically representing the portion of the multimedia work and graphically illustrating a plurality of tracks for a time interval corresponding to that represented by the timeline;

(ii) enable the user to make a clip as active, indicating that said clip does not contribute to an output comprising the multimedia work, or inactive, indicating that said clip does not contribute to said output; and (iii) mark the clip selected by the user as active with a visual indicator shown on the monitor, so that by inspection of the visual indicator and a position of the clip on one of the plurality of tracks that are visible on the monitor, the user can determine a time during which the clip contributes to the output comprising the multimedia work.

9. The system of claim 8, wherein the machines instructions further cause the processor to:

(a) enable the user to select a portion of the clip as active; and (b) mark the portion of the clip selected as active with the visual indicator, the position of the visual indicator relative to the clip indicating the portion of the clip that is active.

10. The system of claim 9, wherein each clip is represented by a rectangle disposed on one of the timelines, a duration of said clip being indicated by a relative size of at least one dimension of the rectangle on the monitor, said visual indicator comprising a colored bar disposed adjacent one edge of the rectangle, a length of the colored bar and position of the colored bar relative to the rectangle indicating the duration of the portion of the clip that is active.

11. The system of claim 9, wherein the machines instructions further cause the processor to automatically make active any portion of a clip added to one of the timelines that does not overlap any portion of another clip that is already active.

12. The system of claim 9, wherein the machines instructions further cause the processor to:

(a) enable the user to select two clips to be simultaneously active at one time when one of a transition and an overlay is to occur between the two clips; and (b) provide a visual indicator of the duration of said one of the transition and overlay between the two clips.

13. The system of claim 12, wherein the visual indicator comprises a color bar.

14. The system of claim 12, wherein the color bar has a color that indicates a specific type of said one of the transition and the overlay between the clips.

15. A method for indicating effects applied to a specific portion of a multimedia work when composing and/or editing the multimedia work, said method comprising the steps of:

(a) displaying a timeline for at least a portion of the multimedia work, said timeline graphically representing the portion of the multimedia work and graphically illustrating at least one track for a time interval corresponding to that represented by the timeline;

(b) enabling the user to select an effect that will apply to the multimedia work and to select a time interval over which the effect will be applied, said effect being associated with a selected track of the timeline by the user and being applied to only a selected portion of the track; and (c) providing an effect indicator that indicates the portion of the track to which the effect applies and the time interval of the effect.

16. The method of claim 15, wherein the track includes an effect region that extends adjacent to the track, said effect indicator being disposed within the track region.

17. The method of claim 15, wherein the effect indicator comprises a colored bar, a length of the colored bar and a position of the color bar relative to the track indicating the time interval over which the effect is applied.

18. The method of claim 17, wherein the effect is applied to a portion of any clip positioned on the track with which the effect is associated, adjacent the colored bar, but is otherwise independent of any clip.

19. The method of claim 17, further comprising the step of enabling the user to modify the time interval over which the effect is applied, including modifying a point in time at which the effect is applied and its duration.

20. The method of claim 15, further comprising the step enabling the user to associate a plurality of effects with the track, each effect having a user selectable time interval that is independent of the time interval of other effects associated with the track.

21. The method of claim 20, wherein the plurality of effects are represented by corresponding color bars that are disposed adjacent to the track with which the plurality of effects are associated, a length and a position of each of the color bars indicating the time and duration at which each is applied to the track.

22. The method of claim 21, wherein predefined different colors are used for the color bars to represent different classes of effects, each predefined color representing a different class of effect.

23. The method of claim 21, wherein an order in which the plurality of effects are applied determines a result in the multimedia work, said color bars representing the plurality of effects being positioned relative to each other so as to indicate the order in which the effects are applied.

24. A system for indicating effects applied to a specific portion of a multimedia work when composing and/or editing the multimedia work, comprising:
 (a) a monitor for displaying the multimedia work and for displaying screens used to compose and edit the multimedia work;
 (b) a memory for storing a plurality of machine instructions defining a software program for composing and editing the multimedia work; and
 (c) a processor, coupled to the memory and to the monitor, for executing the machine instructions stored in the memory, said machine instructions causing the processor to implement the following functions:
  (i) display a timeline for at least a portion of the multimedia work, said timeline graphically representing the portion of the multimedia work and graphically illustrating at least one track for a time interval corresponding to that represented by the timeline;
  (ii) enable the user to select an effect that will apply to the multimedia work and to select a time interval over which the effect will be applied, said effect being associated with a selected track of the timeline by the user and being applied to only a selected portion of the track; and
  (iii) provide an effect indicator that indicates the portion of the track to which the effect applies and the time interval of the effect.

25. The system of claim 24, wherein the track with which the effect is associated includes an effect region that extends adjacent to the track, said effect indicator being disposed within the track region.

26. The system of claim 24, wherein the effect indicator comprises a colored bar, a length of the colored bar and a position of the color bar relative to the track indicating the time interval over which the effect is applied.

27. The system of claim 24, wherein the effect is applied to a portion of any clip positioned on the track with which the effect is associated, adjacent the colored bar, but is otherwise independent of the clip.

28. The system of claim 24, wherein the machine instructions further cause the processor to enable the user to modify the time interval over which the effect is applied, including enabling the user to modify a point in time at which the effect is applied and its duration.

29. The system of claim 24, wherein the machine instructions further cause the processor to enable the user to associate a plurality of effects with the track, each effect having a user selectable time interval that is independent of the time interval of other effects associated with the track.

30. The system of claim 29, wherein different colors are used for the color bars to represent different classes of effects.

31. The system of claim 29, wherein an order in which the plurality of effects are applied determines a result in the multimedia work, said color bars representing the plurality of effects being positioned relative to each other so as to indicate the order in which the effects are applied.

32. A method for indicating a plurality of effects that are applied to clips comprising a multimedia work, when composing and/or editing the multimedia work, said method comprising the steps of:
 (a) displaying a timeline for at least a portion of the multimedia work, said timeline graphically representing a portion of the multimedia work and graphically illustrating at least one track on which is disposed at least one clip;
 (b) enabling the user to select a plurality of different effects that will apply to said clip of the multimedia work and to select a portion of the clip to which each effect will be applied; and
 (c) providing an effect indicator for each effect that indicates the portion of the clip to which the effect applies and the time interval during which the effect applies.

33. The method of claim 32, wherein the effect indicator for each clip comprises a colored bar, a length of the bar and its relative position adjacent the clip indicating the portion of the clip to which the effect applies.

34. The method of claim 33, wherein the colored bars representing each of the plurality of effects selected by the user for application to the clip are stacked adjacent to the clip.

35. The method of claim 34, wherein an order in which the colored bars are stacked indicates a sequence in which the effects are applied to the clip to produce a result.

36. The method of claim 32, wherein the plurality of effects are associated with the clip to which the plurality of effects apply, so that moving the clip along the timeline causes movement of the effects applied to the clip.

37. The method of claim 32, further comprising the step of displaying a descriptive label when a cursor is moved over any effect indicator, said descriptive label identifying a class of effect that is represented by the effect indicator.

38. A system for indicating a plurality of effects that are applied to clips comprising a multimedia work, when composing and/or editing the multimedia work, comprising:
 (a) a monitor for displaying the multimedia work and for displaying screens used to compose and edit the multimedia work;
 (b) a memory for storing a plurality of machine instructions defining a software program for composing and editing the multimedia work; and
 (c) a processor, coupled to the memory and to the monitor, for executing the machine instructions stored in the memory, said machine instructions causing the processor to implement the following functions:
  (i) display a timeline on the monitor for at least a portion of the multimedia work, said timeline graphically representing the portion of the multimedia work and graphically illustrating at least one track on which is represented at least one clip;
  (ii) enable the user to select a plurality of different effects that will apply to said clip of the multimedia work and to select a portion of the clip to which each effect will be applied; and
  (iii) provide an effect indicator to be displayed on the timeline that indicates the portion of the clip to which the effect applies and the time interval within that of the clip, during which the effect applies.

39. The system of claim 38, wherein the effect indicator for each clip comprises a colored bar, a length of the bar and its relative position adjacent the clip indicating the portion of the clip to which the effect applies.

40. The system of claim 39, wherein the colored bars representing each of the plurality of effects selected by the user for application to the clip are stacked adjacent to the clip.

41. The system of claim 39, wherein an order in which the colored bars are stacked indicates a sequence in which the effects are applied to the clip to produce a result.

42. The system of claim 38, wherein the plurality of effects are associated with the clip to which the plurality of effects apply, so that movement of the clip along the timeline causes movement of the effects applied to the clip.

43. The system of claim 38, wherein the machine instructions further cause the process to display a descriptive label on the monitor when a cursor is moved over any effect indicator, said descriptive label identifying a class of effect that is represented by the effect indicator.

44. An article of manufacture adapted to be used with a computer for indicating activeness of a clip to a user who is composing and/or editing a multimedia work that includes a plurality of clips, comprising:

(a) a nonvolatile memory device; and
(b) a plurality of machine instructions stored on the nonvolatile memory device, said machine instructions, when executed by the computer, causing it to:
(i) display a timeline for at least a portion of the multimedia work, said timeline graphically representing the portion of the multimedia work and graphically illustrating a plurality of tracks for a time interval during the multimedia work corresponding to that represented by the timeline;
(ii) enable the user to make a clip active, indicating that said clip is to contribute to an output comprising the multimedia work, or inactive, indicating that said clip does not contribute said output; and
(iii) mark the clip selected by the user as active with a visual indicator, so that by inspection of the visual indicator and a position of the clip on one of the plurality of tracks, the user can determine a time during which the clip contributes to a content of the multimedia work.

45. An article of manufacture adapted to be used with a computer for indicating effects applied to a specific portion of a multimedia work when composing and/or editing the multimedia work, comprising:

(a) a nonvolatile memory device; and
(b) a plurality of machine instructions stored on the nonvolatile memory device, said machine instructions, when executed by the computer, causing it to:
(i) display a timeline for at least a portion of the multimedia work, said timeline graphically representing the portion of the multimedia work and graphically illustrating at least one track for a time interval corresponding to that represented by the timeline;
(ii) enable the user to select an effect that will apply to the multimedia work and to select a time interval over which the effect will be applied, said effect being associated with a selected track of the timeline by the user and being applied to only a selected portion of the track; and
(iii) provide an effect indicator that indicates the portion of the track to which the effect applies and the time interval of the effect.

46. An article of manufacture adapted to be used with a computer for indicating a plurality of effects that are applied to clips comprising a multimedia work, when composing and/or editing the multimedia work, comprising:

(a) a nonvolatile memory device; and
(b) a plurality of machine instructions stored on the nonvolatile memory device, said machine instructions, when executed by the computer, causing it to:
(i) display a timeline for at least a portion of the multimedia work, said timeline graphically representing a portion of the multimedia work and graphically illustrating at least one track on which is disposed at least one clip;
(ii) enable the user to select a plurality of different effects that will apply to said clip of the multimedia work and to select a portion of the clip to which each effect will be applied; and
(iii) provide an effect indicator for each effect that indicates the portion of the clip to which the effect applies and the time interval during which the effect applies.

* * * * *